United States Patent [19]

Wright, Jr. et al.

[11] 4,070,649
[45] Jan. 24, 1978

[54] MULTI-MODAL DATA INPUT/OUTPUT APPARATUS AND METHOD COMPATIBLE WITH BIO-ENGINEERING REQUIREMENTS

[75] Inventors: Sanford J. Wright, Jr., 415 A. St., SE., Washington, D.C. 20005; Peter T. Anderson, Burlington; Ralph S. Grimes, South Burlington, both of Vt.

[73] Assignee: said Sanford J. Wright, by said Peter Anderson and said Ralph Grimes

[21] Appl. No.: 746,611

[22] Filed: Dec. 1, 1976

[51] Int. Cl.² .......................... G06K 9/00; G08C 1/00
[52] U.S. Cl. ........................ 340/146.3 SY; 58/152 R; 178/18; 235/92 CP; 340/324 R; 364/736
[58] Field of Search .................. 340/146.3 SY, 324 R, 340/324 M, 365 R; 235/92 R, 61.7 B, 156, 92 CP, 92 T; 178/18-20; 58/152 R, 50 R

[56] References Cited

U.S. PATENT DOCUMENTS

| | | | |
|---|---|---|---|
| 3,376,551 | 4/1968 | Armbruster | 178/18 |
| 3,487,371 | 12/1969 | Frank | 340/146.3 SY |
| 3,835,453 | 9/1974 | Narayanan | 235/92 R |
| 3,928,960 | 12/1975 | Reese | 235/156 |
| 3,955,355 | 5/1976 | Luce | 58/50 R |
| 4,001,550 | 1/1977 | Schatz | 235/61.7 B |
| 4,005,400 | 1/1977 | Engdahl | 340/146.3 SY |

OTHER PUBLICATIONS

Morrissey, "El. Calculator Based on Character Rec. of Input from Stylus Acceleration Dynamics," IBM Tech. Disclosure Bull., vol, 19, No. 7, Dec, 1976, pp. 2816-2817.

Primary Examiner—Leo H. Boudreau
Attorney, Agent, or Firm—Sixbey, Bradford & Leedom

[57] ABSTRACT

Apparatus and method for sensing, recognizing, displaying, processing and storing motion generated symbolic information including a hand held, mark-forming writing instrument having motion sensing means and a wrist mounted display communicating with the writing instrument through character recognition circuitry to simultaneously display information formed by the writing instrument. An information control and storage circuit is included capable of operating in any one of several possible modes to receive, store and cause the display of information thereby permitting a multiplicity of functions heretofor requiring a vastly greater number of physical components. In particular, this highly portable apparatus readily and broadly compliments the kinesiology of writing instruments and composures that accompany human thinking and problem solving. The operational modes include horological display, data calculation, reminder message storage and display, and financial account storage.

30 Claims, 17 Drawing Figures

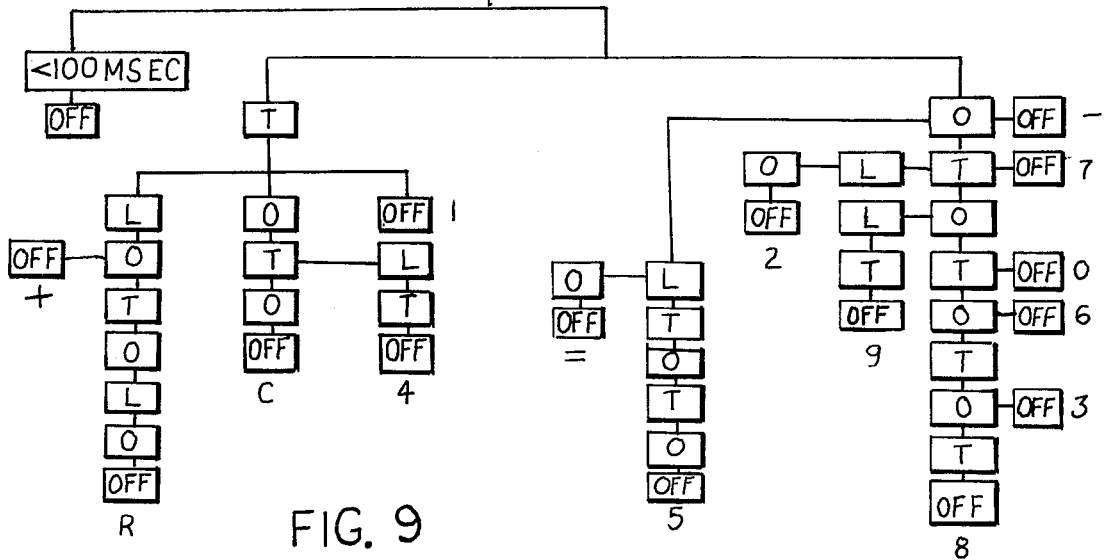
FIG. 9
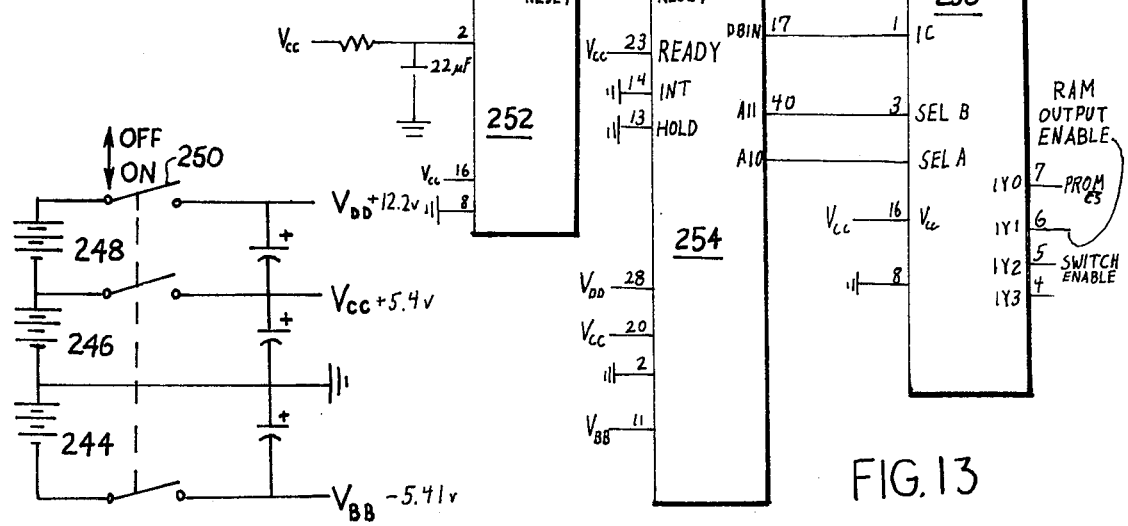
FIG. 10A
FIG. 12
FIG. 13

MULTI-MODAL DATA INPUT/OUTPUT APPARATUS AND METHOD COMPATIBLE WITH BIO-ENGINEERING REQUIREMENTS

BACKGROUND OF THE INVENTION a. Field of the Invention

This invention relates to the field of miniaturized data input/output and character recognition systems.

b. Prior Art

While miniaturization of electronic circuitry for data storage and processing applications has progressed to a highly sophicated state, the benefits which would otherwise derive from this sophistication have been impeded by the failure of data input/output technology to develop with equal rapidity. This situation has become so extreme that further miniaturization of electronic circuitry will yield no appreciable benefit to numerous product areas employing miniaturized electronic data processing circuitry unless input/output devices first undergo significant improvement. But, unlike the data processing circuitry itself, size reduction of input/output devices is limited primarily by human engineering factors. For example, the size of the standard keyboard could easily be reduced significantly except that convenient human finger tip operation would no longer be possible because the size of the smallest standard data input/output symbols can not be reduced below what the human eye is capable of quickly or easily perceiving. A particular example of this dilemma is in the field of hand held calculators where the minimum size required for a convenient keyboard is the only limitation standing in the way of further reduction in overall size.

To date, most efforts at solving this problem have centered strictly on the hardware technology. For example, one approach has been to replace the standard calculator keyboard with specialized keys, each of which may be pivoted by the human finger in any one of four directions to uniquely indicate one of four character symbols or mathematical operators. By use of five such four-way keys, the size of a normal calculator may be reduced to that of a somewhat oversized writing instrument such as embodied for example in a calculator pen sold under the trademark CALCUPEN available from Chafitz, P.O. Box 2188, Dept. 289, Rockville, Maryland. While a decided improvement over the standard pocket calculator in terms of size, devices which need to accommodate five input switches and a standard visual display necessarily retain a rather bulky appearance and feel compared with a standard hand held writing instrument.

In an alternative attempt to avoid the need for the standard bulky keyboard, specialized writing platens employing sensors for responding to symbolic hand motion or the symbolic motion of hand held instruments have been developed. Examples of this type of input apparatus are disclosed in U.S. Pat. Nos. 3,142,039, 3,253,258 and 3,704,343. Although desirable in some respects, there are numerous drawbacks to devices employing specialized writing platens including the high cost of platens and the required specialized training of the operator. More particularly, devices of this type require motion to occur sequentially over distinct predetermined areas in order to yield electrical output signals properly indicative of the symbolic motion.

In another effort to further refine input apparatus, writing instruments have been developed, such as illustrated in U.S. Pat. No. 3,835,435, which generate electrical signals indicative of visual indicia being formed by the movement of the writing tip of the instrument over an ordinary writing surface. This technique is accomplished by including motion sensing transducers in the tip of the writing instrument. While such instruments normally need to be connected with separate character recognition circuitry by means of flexible wiring, the device disclosed in the U.S. Pat. No. 3,835,453 includes a radio transmitter/receiver and visual display on the writing instrument to permit radio communication with remote character recognition circuitry. Furthermore, the U.S. Pat. No. 3,835,453 discloses an optical display directly on the writing instrument for providing a visual verification that the desired input character symbol has indeed been recognized by the electronic circuitry.

While a device which includes a character recognition circuit remote from an input pen solves some of the bulkiness problems inherent in devices which include such circuitry within the pen, mounting of the display on the pen still imposes constraints on possible further reduction in the size of the writing instrument and impairs accurate reading of the displayed information while the writing instrument is in motion. Through normal usage and custom, humans generally learn to solve mathematic problems and compose written language while employing a writing instrument. Devices which position the character recognition circuitry remotely but retain the display on a pen take limited advantage of this fact but may require cessation of hand movement in order that the visual display can be held in a steady, easily read position.

The use of character recognition circuitry with a hand held writing instrument input is well known and has become highly sophisticated as disclosed in the following U.S. patents. U.S. Pat. Nos. 3,145,367; 3,182,291; 3,462,548; 3,500,323; 3,906,444; 3,930,229; While probably enjoying some specialized success, character recognition circuitry using a hand held writing instrument input has apparently not found wide commercial acceptance and does not vie in popularity with the more common keyboards.

An entirely separate approach to satisfying the need for a more convenient miniaturized data input/output system is disclosed in U.S. Pat. No. 3,955,355 which discloses a wrist mounted unit including an electronic display and keyboard interconnected by horological and calculator circuitry. Devices such as disclosed in U.S. Pat. No. 3,955,355 (and in U.S. Pat. No. 3,937,004 disclosing a wrist mounted body condition monitor) exploit the benefits of convenience and small size of mounting an electronic display on the wrist in the manner of a digital watch. However, from a practical bio-engineering standpoint, devices employing a wrist mounted display unit with a keyboard on the display do not solve the problem of making the input of data convenient for the user. For example, a device which requires both the display and the keyboard to be wrist mounted inherently requires a bulky overall size in order for the user to be able to accurately operate the keyboard.

In short, most efforts at miniaturization of input/output structure for small sized data storage and processing circuitry have centered on the introduction of new hardware technology rather than creating a more bio-compatible input/output system. In previous instances where prior art components have been reorganized, accuracy and ease of operation of either the input or output data processing structure has been compromised.

Significant improvement in products used directly by humans need not derive solely from technological breakthrough. In fact, attention to bio-engineering principles, that is the reorganization of known components to facilitate the ease with which a human interacts with his environment, can produce results every bit as startling as major technological advance.

SUMMARY OF THE INVENTION

The object of this invention is to overcome the drawbacks of the prior art as discussed above by providing a device for sensing, recognizing, displaying, processing and storing symbolic motion information in a manner which makes maximum use of electronic circuit miniaturization while simultaneously providing an optimal organization of the input and output structure from a bio-engineering standpoint. More particularly, the subject invention provides input/output hardware having two individual components of commonly accepted form but having unique functional capability and cooperation wherein the system is capable of performing a multiplicity of functions heretofor requiring a vastly greater number of physical components. More particularly, the subject invention combines in a single miniaturized system the ability to accurately recognize symbolic hand motion by use of a hand held writing instrument used in a normal way, while simultaneously electronically displaying the written symbolic characters on a stationary wrist mounted display held within the field of vision of the human whose hand motions are being sensed. The wrist mounted electronic display is, thereby, held in a steady, easily readable position during the analytical or problem solving period while the arm on which the display is mounted may be used to hold steady a piece of paper on which the writing instrument is forming a permanent visible record of the input information.

It is yet another object of this invention to provide apparatus for sensing, storing, recognizing and displaying symbolic motion of the human hand including a mechanical writing instrument means having a motion sensing means at one end for converting hand movement into electrical signals and an electronic visual display means for displaying symbolic characters representative of the motion sensed by the motion sensing means, wherein the display means may be removably supported on the wrist of one arm of a human whose other arm is supporting the mechanical writing instrument. The disclosed apparatus further includes an electronic symbolic motion identification means for producing symbolic character indicating electrical signals for the display means, wherein the symbol indicating electrical signals are representative of only those electrical signals produced by the motion sensing means which are validly representative of one of a predetermined set of symbolic hand motions.

Still another object of this invention is to provide information control and storage means in combination with the elements set forth above for storing and manipulating signals after being visually displayed by the electronic visual display means. In particular, the information control and storage means may include electronic horological means for producing signals representative of accurate horological and chronological information for display by the wrist mounted electronic visual display means. Further storage means may be provided for storing reminder messages in association with corresponding date/time comparator means for comparing the date and time signals produced by the electronic horological means with the stored date and time representative signals to produce a message display signal causing the electronic visual display means to display the associated message whenever equality exists between the stored date and time representative signal and the date and time signals produced by the electronic horological means.

Still another object of this invention is to provide in combination a system set forth above wherein the information control and storage means further includes calculator circuit means for responding to the input of numerical and mathematical operator signals to produce answer signals representative of the results of the performance of the mathematical operations wherein the answer signals are operative to cause the electronic and visual display means to display the correct mathematical result.

Other important advantages and objects of subject invention will be apparent from the following description of the preferred embodiment.

SUMMARY OF DRAWINGS

FIG. 9 is a diagrammatic flow chart illustrating the logic decisions necessary for implementing recognition of the motion sensed by the mosiong sensing means of FIGS. 6 and 7;

FIG. 10A is a schematic diagram of a transducer means for use as the input to the circuit of FIG. 10;

FIG. 12 is a schematic diagram of the power source for the microprocessor circuit embodiment of FIG. 11.

FIG. 13 is a schematic diagram of a clock circuit for the microprocessor embodiment of FIGS. 11–12 using integrated circuits;

DESCRIPTION OF THE PREFERRED EMBODIMENT

Figure 1:
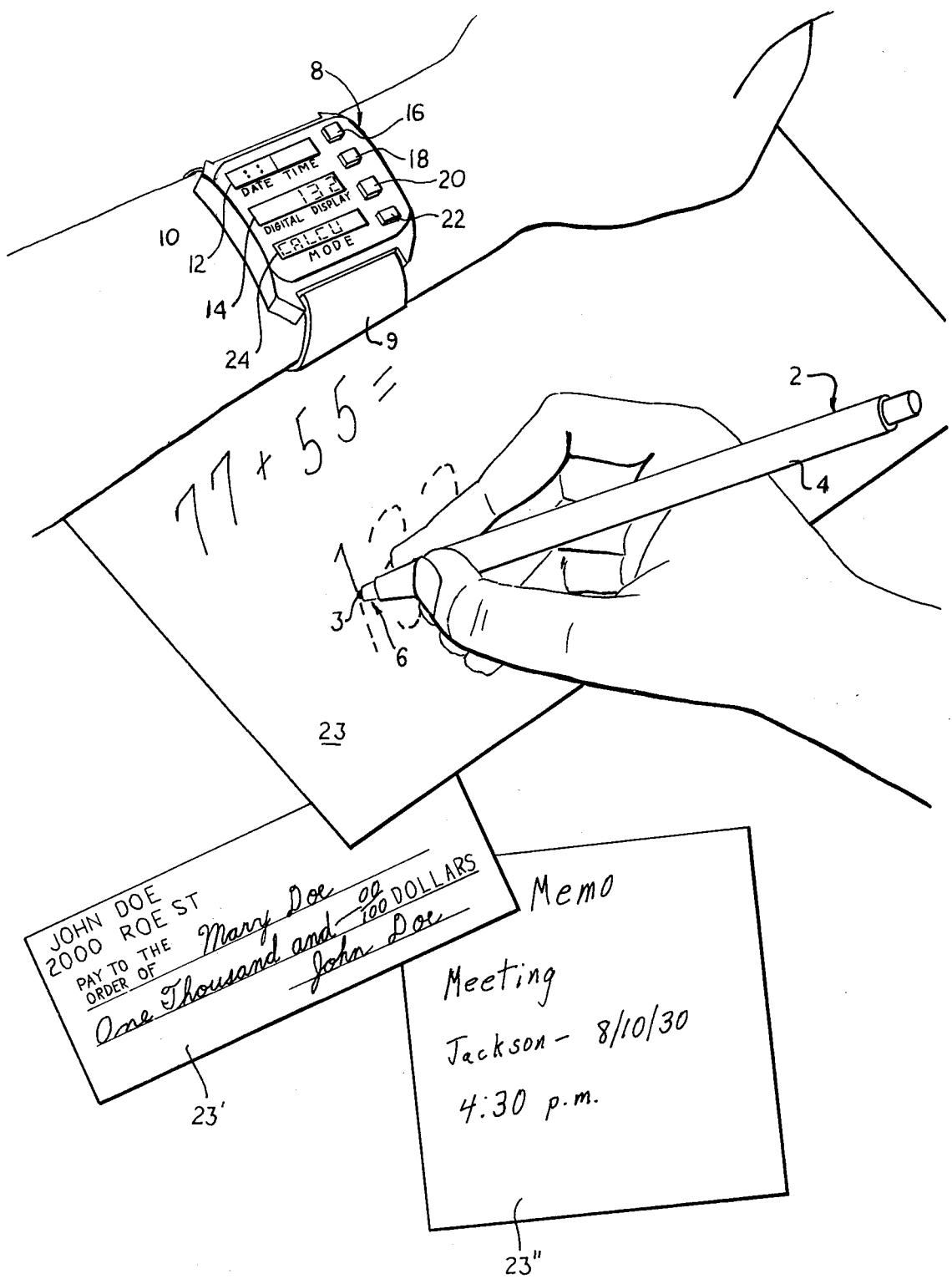
FIG. 1 is a perspective view of one embodiment of the invention actually being employed by the user.

As developed earlier, one specific embodiment of the subject invention is disclosed in FIG. 1 to take advantage of the normal custom and propensity of humans to solve problems and think more accurately while using a writing instrument. In particular, FIG. 1 illustrates a mechanical writing means 2 constructed in accordance with this invention as having a writing tip 3 for forming a permanent visible record of the symbolic movement of a human hand. The mechanical writing instrument means 2 includes an elongated housing 4 which may be gripped by the human fingers and a motion sensing means 6 (described in more detail hereinbelow) connected with one end of the elongated housing 4, wherein the motion sensing means 6 is responsive to human hand movement to convert symbolic and non-symbolic movement of the human hand relative to a reference point into an electrical signal representative of the hand movement. An electronic visible display means 8, illustrated in FIG. 1 as being mounted on the wrist of a user by wrist support means 9 in the form of a wrist encircling strap, is adapted to house an electronic symbolic motion identification means 10 (which will also be described in greater detail below) for communicating with the motion sensing means 6 to produce symbol indicating electrical signals representative of only those electrical signals produced by the motion sensing means 6 which are validly representative of one of a predetermined set of symbolic hand motions. The electronic visible display means 8 converts the symbol indicating electrical signals to a visible display which may appear on either of the display windows 12 or 14 dependent upon the mode in which the device is then operating. The device mode is determined by actuation of one of the mode switches 16, 18, 20 and 22 with an indication of the mode appearing in display window 24.

This disclosed arrangement of hand held writing means 2 and wrist mounted display means 8 thus provides the synergistic result of permitting the user to simultaneously produce a permanent visible record on a writing surface such as a piece of paper 23 while producing an electronic display in window 14 verifying that the electronic symbolic motion identification means 10 has properly identified the symbolic character formed by the writing instrument means 2. In addition to this advantage, it must again be stressed that these already time tested components of the system are individually familiar to the average person and are used in a customary manner.

FIG. 1 includes diagrammatic samples of three different modes in which the subject invention may be used to produce a written record of input data. For example, when used in the calculator mode, switch 18 is activated and writing instrument means 2 is used to write out the numbers and mathematical operations on paper 23 which the user desires to have electronically computed. Upon display of a correct answer the writing instrument may be used to record the answer. The system may also be used to maintain financial records whereupon switch 16 is actuated and the writing instrument means 2 is used to fill out a check 23' for simultaneous display and storage within circuitry to be described in detail below. A further example of the application of the subject system is as a message reminder wherein a desired message with corresponding date and time may be written by means 2 on any piece of paper such as memo sheet 23" for simultaneous storage and subsequent display upon a designated date and time. The manner for accomplishing these functions will be described in detail hereinbelow.

Figure 2:
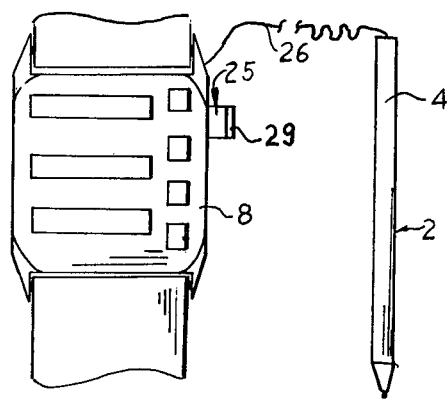
FIG. 2 is a broken away elevational view disclosing an electrical wire connection between the writing instrument and wrist display of the subject invention.

FIG. 2 illustrates a device embodying the subject invention wherein the mechanical writing means 2 is connected to the wrist mounted electronic visible display means 8 by means of an electrical wire 26 which may be of the coiled variety or which may be adapted for recoiling upon a spool contained within the wrist mounted electronic visible display means 8 or the elongated housing 4 of the mechanical writing means. A support means 25 may be provided in combination with the wrist mounted electronic visible display means 8 for selectively supporting the writing means 2 on the display means. One form of the support means 25 may be provided in combination with the wrist mounted electronic visible display means 8 for selectively supporting the writing means 2 on the display means. One form of the support means would be a spring clip 29 as illustrated in FIG. 2.

Figure 3:
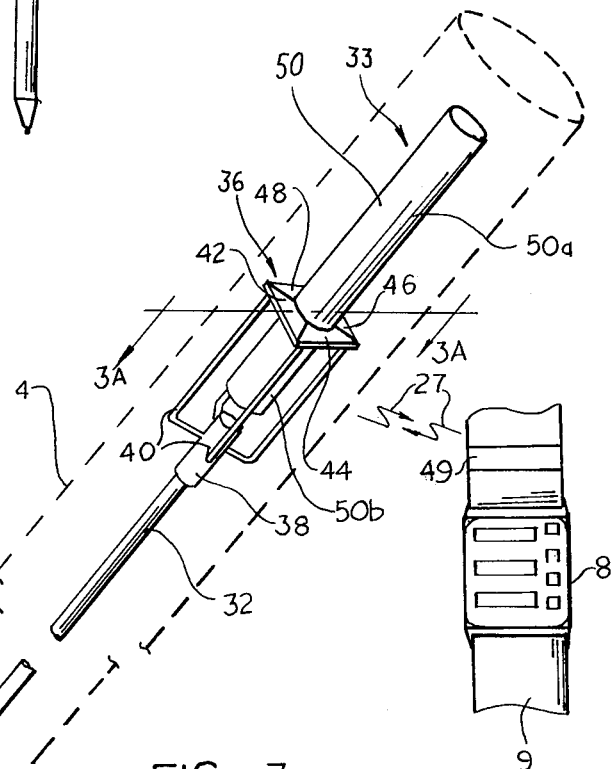
FIG. 3 is a perspective view of one embodiment of a writing instrument employing a passive transponder which may be used in the subject invention.

Turning now to FIG. 3, a second embodiment of the invention is disclosed in which the mechanical writing means which embodies a passive transponder 33 and the electronic visible display means communicate by means of modulated electromagnetic waves aerally transmitted as depicted by arrows 27. In particular, the elongated housing member 4, illustrated in dashed lines, encloses a conventional ball point pen cartridge 28 mounted by means of a universal ball joint 30 such that the proximal end 32 of the pen cartridge moves in response to the fictional force developed by movement of the ballpoint pen end 34 over the writing surface 35. Mounted near the proximal end 32 of the cartridge is the passive transponder 33 including a composite dielectric assembly 36 connected to the proximal end 32 by means of cup shaped member 38 and four L-shaped fingers 40. Dielectric assembly 36 includes four triangular dielectric segments 42, 44, 46, and 48. As ballpoint pen end 34 moves over a sheet of writing paper in response to hand movement, dielectric assembly 36 is caused to move through a radiating cavity 50 which is adapted to receive electromagnetic radiation and cause re-radiation of the electromagnetic waves modulated differentially in accordance with which one of the four dielectric segments 42, 44, 46, or 48 has moved into the radiating cavity 50. As illustrated in FIG. 3, the radiating cavity 50 is made up of sections 50A and 50B such that the dielectric assembly 36 passes between the radiating cavity sections. The radiating cavity 50 and the dielectric assembly 36 combine to form a passive transponder means for receiving electromagnetic radiation and for modulating the radiation in accordance with hand motion for re-radiation. The art of passive transponder design is well known such as illustrated in U.S. Pat. Nos. 3,836,962 and 3,886,548.

Figure 3A:
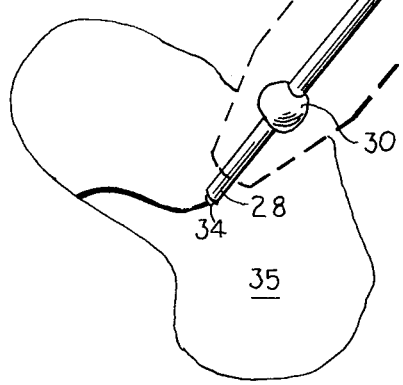
FIG. 3A is a cross-sectional view of the writing instrument of FIG. 3 taken along lines 3A–3A.
Figure 3A:
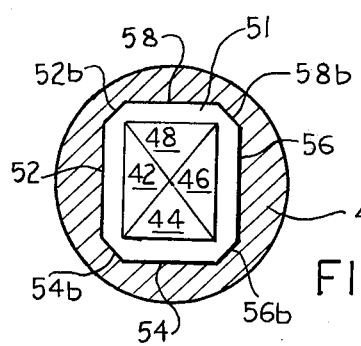

As will be described in more detail hereinbelow, the wrist mounted electronic visible display means 8 disclosed in FIG. 3 may be combined with an electromagnetic wave transmitter/receiver circuit means 49 for radiating an unmodulated electromagnetic wave and receiving a return electromagnetic wave from the radiating cavity 50 modulated in accordance with dielectric material moved into the cavity as a result of the hand motions of the user of the mechanical writing means 2. The cross-section shown in FIG. 3A discloses that elongated housing member 4 may be provided with an inside housing cavity 51 adjacent the dielectric assembly having a square cross section made up of faces 52, 54, 56 and 58 for engaging dielectric segments 42, 44, 46 and 48, respectively. Elongated housing member 4 is made of material which is transparent to the wave length of electromagnetic radiation employed by the transmitter/receiver means 49 mounted on the wrist support means 9 in electrical communication with the motion identification means 10 within the electronic visible display means 8. The materials, dimensions and shape of the radiating cavity 50 are determined in accordance with the characteristics of the electromagnetic wave length chosen for transmission of information from the pen to the wrist mounted electronic visible display means 8. The housing cavity 51 is further characterized by the provision of four additional short faces 52b, 54b, 56b and 58b arranged at 45° to the faces 52, 54, 56 and 58 as illustrated in FIG. 3A. By this arrangement, up and down and left to right movements result in one of four discrete positions of the dielectric assembly with respect to radiating cavity 50 since short faces 52a, 54a, 56a and 58a will cause the dielectric assembly to slide into aligned contact with one of the housing cavity faces. As will be explained more fully below, the speed of symbolic hand movement versus non-symbolic hand movement of the normal human is used to control the rapidity with which the position of the dielectric assembly is measured in order to lessen the likelihood of sensing an incorrect symbol indication position of the dielectric assembly 36.

Figure 4:
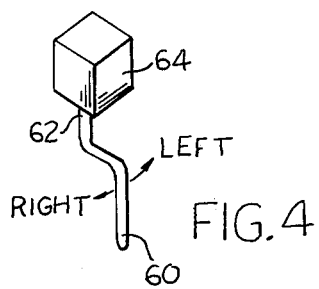
FIG. 4 is a perspective view of an offset motion sensing means connected to one end of the writing instrument.

FIG. 4 illustrates an alternative embodiment of the motion sensing means wherein the visible record forming writing tip 60 is offset from the longitudinal axis of the mechanical support 62 to which the writing tip 60 is attached. With this embodiment, left and right movement of the writing instrument will result in torsional forces being developed within mechanical support 62. A variety of electrical transducer means 64 may be provided for converting this torsional force into an output electrical signal. In particular, capacitive, electromagnetic, pressure sensitive strain gauges, spring restoring and mechanical switch systems, photosensitive or crystal sensors may be employed.

Figure 5:
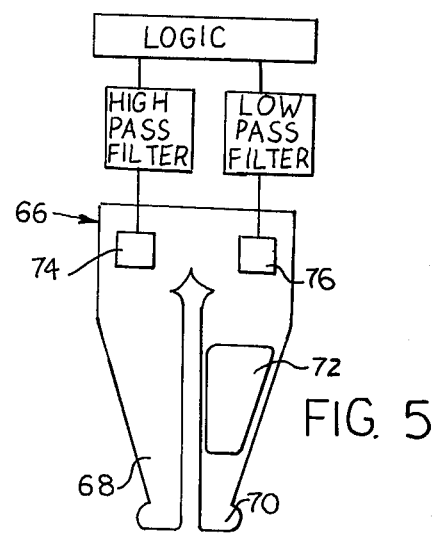
FIG. 5 is a schematic diagram of a piezoelectric motion sensing and associated circuit adapted for connection to the writing instrument.

FIG. 5 discloses a differential oscillating and coding tip for use as an alternative type of motion sensing means. As illustrated, the tip includes a sensing nib having first and second projections 68 and 70 wherein the second projection 70 includes a weight 72 causing a variation in the vibrational characteristics of the projections. Piezoelectric crystals 74 and 76 attached to the first and second projections 68 and 70, respectively, are adapted to produce electrical signals in response to the vibrational characteristics of first and second projections 68 and 70, respectively, and in response to the contact and the direction of movement of the differential oscillator encoding tip with respect to the writing surface.

Figure 6:
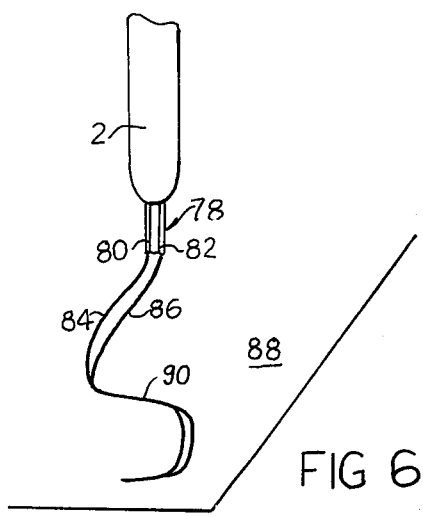
FIG. 6 is a perspective view of another motion sensing means for connection with the writing instrument.

FIG. 6 discloses still another embodiment of the motion sensing means for use in practicing the subject invention, wherein the visible mark forming means 78 includes first and second mark forming elements 80 and 82 for causing two visible marks 84 and 86, made of electrically conductive material having a known resistive value, to be formed on the writing surface 88. By forming the elements 80 and 82 of electrically conductive material and connecting them to the input of the electronic symbolic motion identification means 10, changes in the resistive path formed by elements 80 and 82 may be sensed to determine the direction of movement of the writing instrument means 2 as it is moved over the writing surface 88. More particularly, whenever the visible marks 84 and 86 cross as at point 90, the resistance of the conductive path including elements 80, 82 and the visible mark material will abruptly change to produce a detectable motion indicating characteristic.

Figure 7:
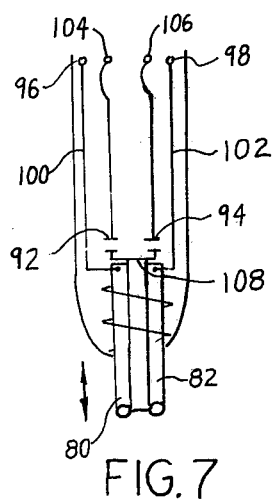
FIG. 7 discloses a pressure sensitive switch for use in combination with the motion sensing means of FIG. 6.

As indicated in FIG. 7, the first and second mark forming elements 80 and 82 may be spring biased out of contact with a pair of electrical contacts 92 and 94. Thus the resistive characteristic between output contacts 96 and 98 connected to first and second mark forming elements 80 and 82 through electrical conductors 100 and 102, respectively, would be indicative of motion of the writing instrument means 2 in two perpendicular directions relative to the writing surface 88. Furthermore, the electrical characteristic across contacts 104 and 106 connected with contacts 92 and 94, respectively, which may be selectively connected by conductor element 108 in response to pressure of the motion sensing means against the writing surface 88, would be indicative of whether the writing instrument means is in contact with the writing surface. Thus, the motion sensing means of FIG. 7 is capable of producing signals indicative of three distinct states, that is: state T in which contacts 104 and 106 are connected by connective element 108 and contacts 96 and 98 are connected by low resistance indicating that the writing instrument means is in contact with the writing surface 88 and that the first and second mark forming means 80 and 82 are forming marks which are interconnected on the writing surface immediately adjacent the extremities of elements 80 and 82; state O in which low resistance between contacts 104 and 106 but high resistance between contacts 96 and 98 indicate that the writing instrument means is in contact with the writing surface 88 but that the mark forming elements 80 and 82 are moving in a direction which causes the visible marks to be formed in two non-intersecting, parallel segments immediately adjacent the extremities of elements 80 and 82; and state L in which high resistance between all the contacts 104 and 106 and between 96 and 98 indicate that the writing instrument means has been lifted out of contact with the writing surface 88.

Figure 8:
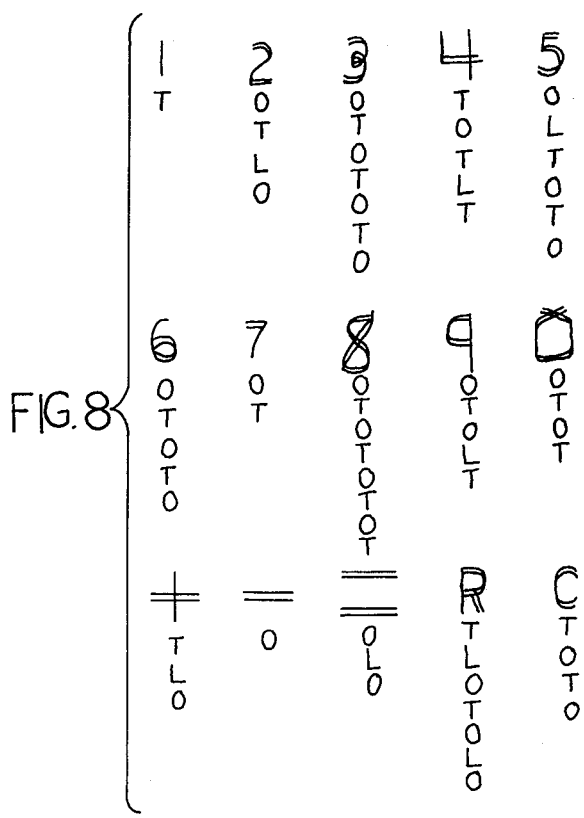
FIG. 8 is a diagrammatic chart illustrating the operation of the motion sensing means of FIGS. 6 and 7.

FIG. 8 is a chart of the resistance between contacts 96, 98, 104 and 106 as indicated in the preceding paragraph which conditions are formed sequentially during the symbolic motion required for forming the standard arabic numerals and mathematical symbols. Note that beneath each character is a list of states corresponding to the above indicated states of electrical contacts illustrated in FIG. 7 as would occur during the formation of the associated character.

FIG. 9 discloses a logic flow chart for the motion sensing means of FIGS. 6 and 7 which indicates the manner in which each of the symbols indicated on chart 8 could be uniquely identified by the succession of electrical states of contacts 96, 98, 104 and 106 illustrated in FIG. 7. Note that the function of the motion sensing means requires that the operator intentionally provide a longer period of time between the finish of a preceding symbol and a succeeding symbol as compared with the time permitted to lapse between strokes forming a single character wherein the writing instrument means is lifted off the writing surface.

All of the preceding embodiments of the motion sensing means require that the elongated housing member 4 be configured in such a way that the user would be confined to a single correct orientation of the writing means relative to the hand of the user. Alternatively, the electronic symbolic motion identification means could be provided with additional circuitry responsive to the formation of a predetermined character upon each initiation of the circuit operation or of the repositioning of the writing instrument means relative to the hand with which the writing instrument means is gripped. Since the electronic symbol motion identification means would be preconditioned to switch the sequence of electronic states through which the writing instrument means passes upon initial use of the writing instrument means, the succession of states, associated with the respective characters or symbols to be formed, could be adjusted in accordance with the manner in which the writing instrument means is grasped in the hand of the user.

When the passive transponder of FIG. 3 is omitted in favor of the wire connection of FIG. 2, the writing instrument may contain the electronic symbolic motion identification means (as described below) entirely within the elongated housing member 4.

Figure 10:
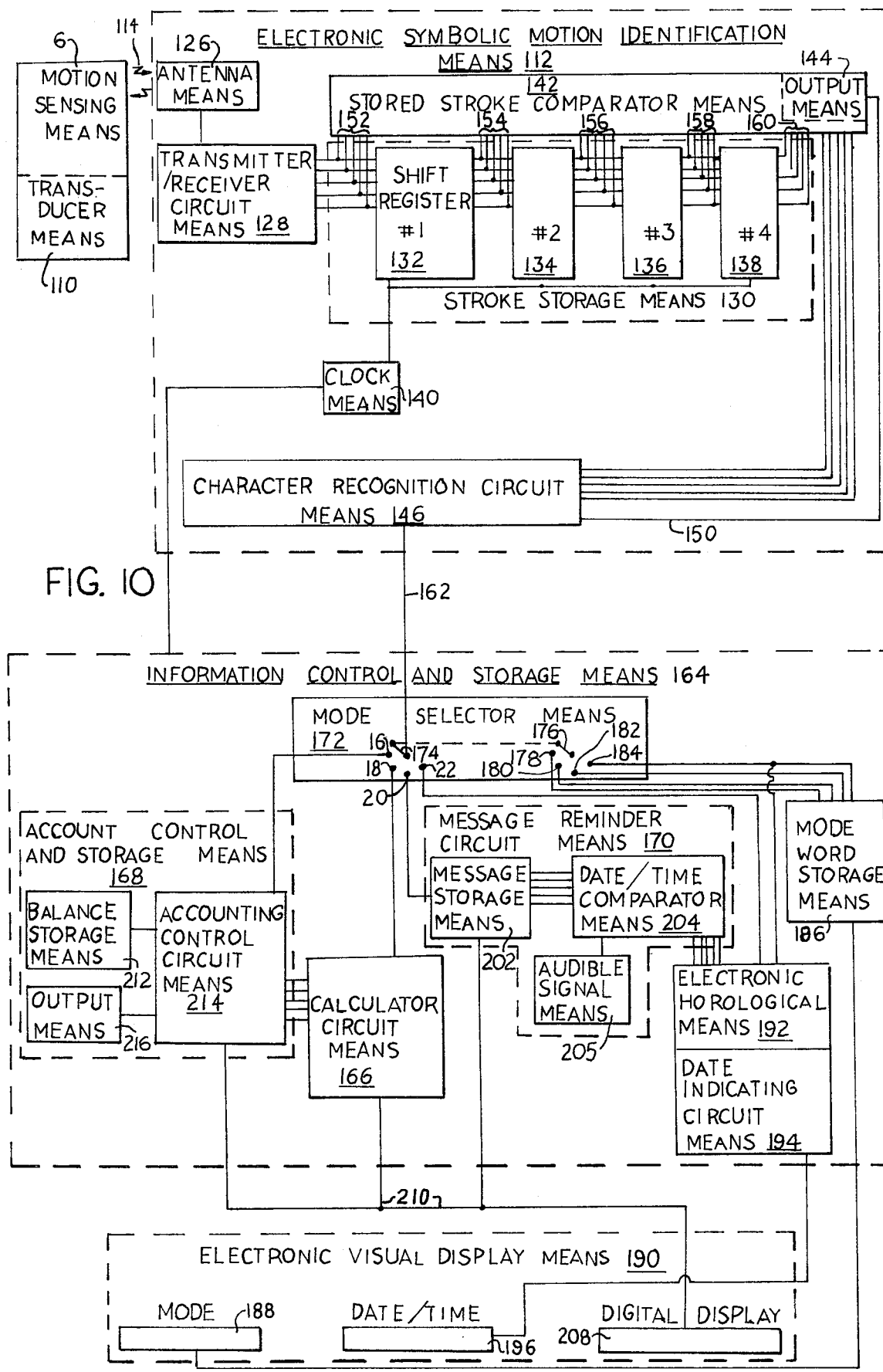
FIG. 10 is a schematic circuit diagram for implementing a multi-mode embodiment of the subject invention.

Turning now to FIG. 10, one specific embodiment of the circuit design for carrying out the disclosed invention is illustrated. In particular, the circuit of FIG. 10 is specifically designed to permit the apparatus illustrated in FIG. 1 to function in a variety of modes dependent upon the desire of the user to thereby obtain the greatest possible benefit from the optimal organization of hardware components disclosed herein. These various functions will become apparent by reviewing the details of the illustrated circuit. Motion sensing means 6 is illustrated diagrammatically as including transducer means 110 for producing signals representative of hand motion wherein the signals may then be transmitted by the motion sensing means to the electronic symbol motion identification means 112 either by electromagnetic radiation diagrammatically shown by arrow 114 or by electrically conductive connection as illustrated previously in FIG. 2. Transducer means 110 may itself take a variety of configurations such as illustrated in FIGS. 3–6 or as illustrated in FIG. 10a, wherein a series of mechanical switches 116, 118, 120, 122, are selectively closed upon hand movement in the direction indicated for each switch, respectively. The output from the transducer means illustrated in FIG. 10a would therefore constitute digital stroke signals representative of a predetermined set of symbolic hand strokes which signals could be transmitted via five separate electrical conductors directly to the electronic symbolic motion identification means 112. Alternatively, as illustrated in FIG. 10, the motion sensing means 6 could take the form illustrated in FIG. 3 and be adapted to transmit electromagnetic waves representative of the digital stroke signals to an antenna means 126 connected to a transmitter/receiver circuit means 128 for radiating electromagnetic radiation and for receiving modulated electromagnetic radiation the motion sensing means 6. The transmitter/receiver circuit means 128 is adapted to convert the received signals into symbol indicating electrical signals such as digital stroke signals representative of one of a set of symbolic hand motions such as would be sensed by the motion sensing means of FIG. 3.

The electronic symbolic motion identification means 112 further includes stroke storage means 130 for storing successive digital stroke signals representative of the output of the transducer means 110 during successive time intervals. As illustrated in FIG. 10 the stroke storage means 130 includes four shift registers 132, 134, 136 and 138 for storing four successive digital stroke signals representative of the digital electronic signals produced by transducer means 110 during the four preceding time intervals. Transmitter/receiver circuit means 128 and shift registers 132–138 are well known standard circuit components which may be obtained commercially from a variety of sources. When using a transducer means such as illustrated in FIG. 10a the shift register should be provided with at least five storage cells, each cell being capable of storing a digital signal representative of the condition of the respective mechanical switches illustrated in FIG. 10a. Clock means 140 connected to each of the shift registers is designed to provide a shift pulse every 2 milliseconds to cause shifting of the stored signals from left to right through the shift registers. The output of the transmitter/receiver circuit means 128 and the stored signals in the shift registers may be compared in a stored stroke comparator means 142 connected to components 128, 132, 134, 136 and 138 by conductor groups 152, 154, 156, 158 and 160 to verify that the received signal from the motion sensing means 6 is indeed a valid stroke signal. The stroke signal from motion sensing means 6 must therefore last for 0.01 second (5 times 2 milliseconds) before the storage stroke comparator means 142 produces a stroke valid signal from the output means 144 to cause transfer of the digital stroke signal to the character recognition circuit means 146 via electrical conductors 148. This stroke valid signal is transferred to character recognition circuit means 146 via conductor 150. By requiring the motion sensing means to maintain a constant output for at least 0.01 seconds, various spurious hand motion signals can be eliminated such as the alpha frequency of eight to twelve cycles per second recognized to be the tremor rate of the hand of a normal human being. The stored stroke comparator means 142 may be designed so as to produce a stroke valid signal when at least four of the inputs thereto from the transmitter/receiver circuit means 128 and the shift registers 132–138 provided by conductor groups 152, 154, 156 and 158 and 160 are equal to thereby permit operation of the system even though some spurious signals enter into the processing circuitry.

The character recognition circuit means 146 may take a variety of forms such as any one of the circuit designs disclosed in the prior art discussed above dependent upon the degree to which the disclosed circuits can be miniaturized by known integrated circuit techniques and still provide a wrist supportable unit. Alternatively, the character recognition circuit means may take the form of a specially programmed microprocessor system as will be discussed in more detail with reference to FIGS. 11 through 14. Regardless, however, of the exact form of the character recognition circuit, the function of the circuit will be to accept successive stroke valid signals provided via conductors 148 from the storage stroke comparator means for comparison with stored sequences of digital stroke signals uniquely identifying each of a set of symbolic characters. The character recognition circuit means 146 includes an output 162 over which signals may be provided representative of the symbolic character identified from the successive valid digital stroke signals received from the stored stroke comparator means 142.

The output from the character recognition circuit means 146 is provided to an information control and storage means 164 including a variety of special purpose circuit systems selectively operable by the system user dependant upon the overall purpose to which the system is to be put. In particular, symbolic character signals from the character recognition circuit means 146 may be provided to a calculator circuit means 166, an account control and storage means 168 or a message reminder circuit means 170. Selection of one of these circuits is depedent upon the setting of mode selector means 172 including mode switches 16, 18, 20 and 22 schematically illustrated in FIG. 1. The mode selector means 172 may take a variety of forms but is illustrated in FIG. 10 as including first and second rotatable elements 174 and 176 operatively connected together such that element 174 may be moved into contact with mode switches 16, 18, 20 or 22 dependent upon the desired mode of operation of the overall apparatus. Simultaneously with movement of element 174, element 176 is caused to be moved successively to contacts 178, 180, 182 and 184 corresponding to mode switches 16, 18, 20 and 22, respectively. While element 174 is adapted to provide the output from the character recognition circuit means 146 to the respective associated mode switches, element 176 is adapted to provide a bias potential to the respective contacts associated therewith. These contacts are individually connected to a mode word storage means 186, in turn connected to a mode display 188 within an electronic visual display means 190. Mode word storage means 186 is designed to store digital signals representative of word forming characters describing the mode of operation of each of the circuits connected to the respective corresponding mode switches 16, 18, 20 and 22. Dependent upon which of the contacts 178, 180, 182, 184 is provided with a bias by switch element 176, the appropriate corresponding word is displayed on mode display 188 to thereby visually indicate to the system user which of the possible operational modes the system is then capable of executing.

Turning now to each of the mode performing circuit systems, attention is directed to electronic horological means 192 for producing signals representative of time. Such electronic circuitry is well known as demonstrated in U.S. Pat. No. 3,823,551 and may further be provided with date indicating circuit means 194 for producing electrical signals representitive of the day of the year. By connecting the output from circuits 192 and 194 to a date/time display 196 within the electronic visual display means 190 the system user may be provided with an indication of the date and time whenever mode selector switch element 174 is moved into contact with mode switch 22 causing corresponding movement of switch element 176 to provide a bias to contact 184. In addition to causing appropriate display of characters indicating the mode of operation of mode display 188, the application of bias to contact 184 results in the application of a display activating signal to circuits 192 and 194 via conductor 198. Circuits 192 and 194 are also connected to a message reminder circuit means 200 for producing reminder messages upon a preselected time and date. The message reminder circuit means 170 includes a message storage means 202 for storing electrical signals provided from said character recognition circuit means 146 through mode switch 20 wherein the electrical signals are representative of displayable message information and associated future times and dates upon which it is desired that the stored message be displayed. A date/time comparison means 204 connected with the message storage means 202 and circuits 192 and 194 for comparing signals from circuits 192 and 194 representative of the present time and date with the signals stored in the message storage means 202 to cause the stored signals representative of displayable message information to be displayed by the electronic visual display means 190 upon detection of a predetermined relationship. In particular, date/time comparator means 204 is adapted to respond to equality between the present time and date signals provided by circuits 192 and 194 and a stored date and time signal within the message storage means 202 to thereby cause display of the associated stored message signal. The message reminder circuit means 170 may include an audible signal means 205 for producing an audible signal whenever a message is being displayed by the electronic visual display means 190. The arrangement of circuit elements within the system as disclosed herein is designed to provide extremely convenient yet easily operated reminder capability to the user regardless of his physical location or time of day. In particular, messages could be stored simply by activating the appropriate mode selector switch 20 and commencing to write the desired stored message, date and time on any writing surface by use of the writing instrument means 2. Upon verification of the accuracy of the written message as then displayed on the electronic visual display means 190, an appropriate activating symbol could be written by the writing instrument means causing the character recognition circuit means 146 to transmit the appropriate signal to the message storage means 202 preprogrammed to recognize the appropriate signal to cause storage of the message, date and time signals within the message storage means 202 for periodic comparison with the date and time signals produced by circuits 192 and 194. Thus, upon the future appropriate date and time as indicated by circuits 192 and 194, audible signal means would notify the user of the system that the desired message was being displayed upon the electronic visual display means 190.

The information control storage means 164 may also be provided with a calculator circuit means 166 for responding to sequences of character signals representative of numbers and mathematical operators as provided from the character recognition circuit means 146 through load selector switch 18 to produce answer signals representative of the results of performing the mathematical operations upon the numbers contained in the sequence of character signals. Calculator circuit means 166 may be connected to digital display 208 through output conductor 210. Again, it should be noted that the provision of a calculator circuit within the overall system would provide an unusually important advantage of the specific combination of component elements comprising the subject apparatus. In particular, the writing instrument means could be used to provide an initial written record of the numbers and mathematical operators necessary to define a particular desired mathematical operation while the digital display 208 provides an immediate verification that the calculator circuit means 166 has received the correct number and mathematical operator symbols. Upon the formation of predetermined symbol such as an equal sign "=" the calculator circuit means can be designed in the conventional way to undertake to perform the various mathematical operations set forth in the equation produced by the writing instrument means. Upon display of the answer by the digital display 208, the system user could then copy the correct answer to complete the permanent visual record of the calculation actually performed by the calculator circuit means upon the writing surface. When used in this mode and in this manner, the subject system is adapted to provide the full equivalent of a visible record forming desk-type calculator. As will be discussed in greater detail with reference to FIG. 15, the calculator circuit means 166 may be provided with an answer comparator capability for removing the displayed answer from digital display 208 upon recognition that the writing instrument means has correctly reproduced the answer then being displayed.

The information control and storage means 164 may further include an account control and storage means 168 for storing the sequences of character signals representative of negotiable instrument transactions including payee, payor, amount and date representative signals formed by the motion sensing means 6. The account control and storage means 168 may further include a balance storage means 212 for storing a signal representative of a checking account balance and account control circuit means 214 connected with the calculator circuit means 166 and the character recognition circuit means 146 through mode selector switch 16 for storing a new checking account balance signal produced by the calculator circuit means 166 whenever signals are received from said character recognition circuit means 146 representative of checking account deposits and negotiable instruments transactions. Naturally signals representative of deposits will be added to the balance already existing in the balance storage means 212 by calculator circuit means 166 and the amounts of negotiable instruments would be subtracted from the balance stored in the balance storage means 212. The accounting control circuit means 214 can be provided with storage capability for recording each successive negotiable instrument transaction. The account control and storage means 168 could further be provided with output means 216 for transferring all of the signals stored in the account control circuit means representative of negotiable instrument transactions performed by the user with the use of the writing instrument means 2 since the last time that the stored information was removed.

Figure 11:
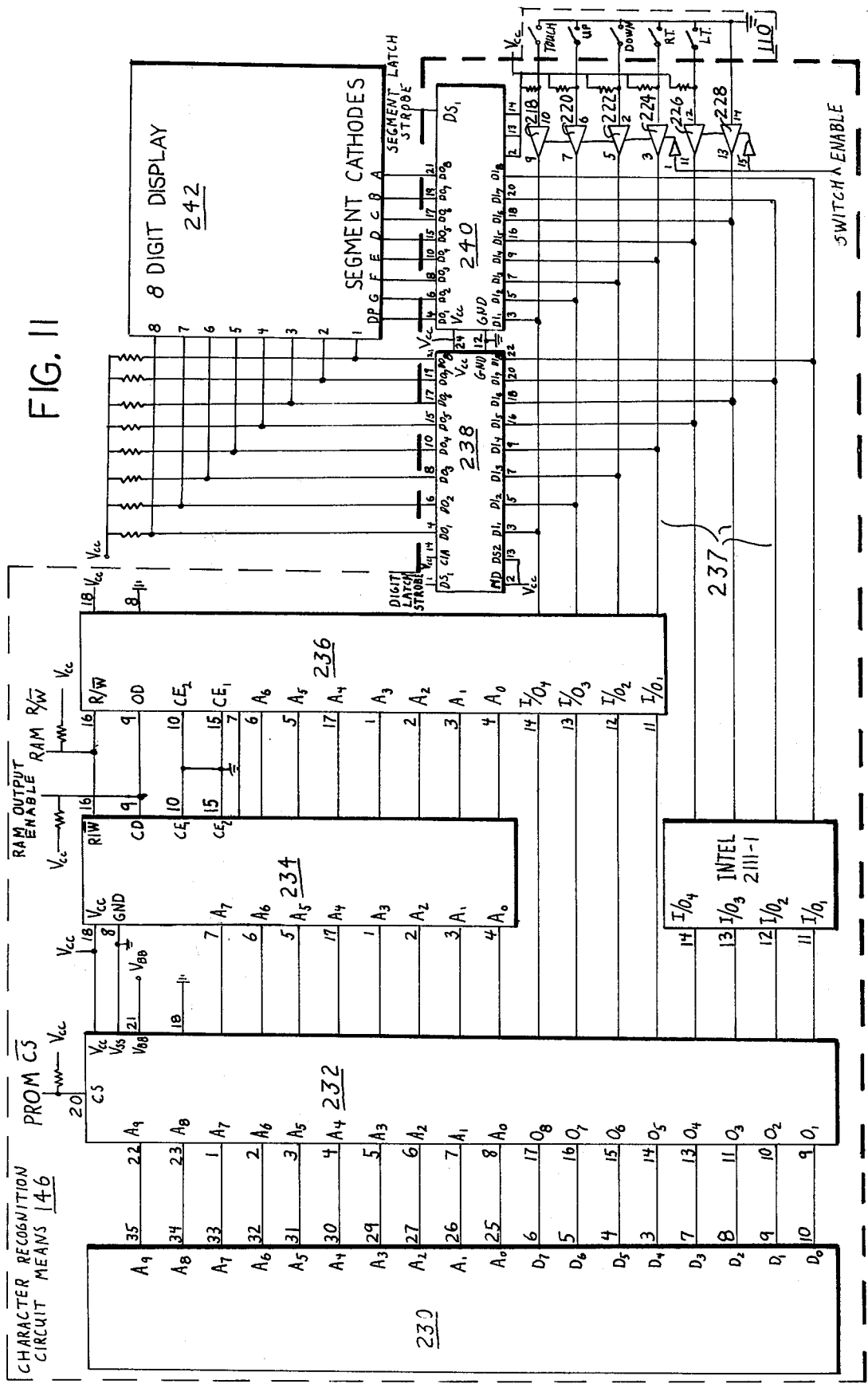
FIG. 11 is a detailed circuit diagram of a character recognition circuit microprocessor.

Attention is now directed to FIGS. 11 through 14 which disclose a specific embodiment of the character recognition circuit means 146 employing a microprocessor unit. In particular, the character recognition circuit of FIG. 11 is connected to transducer means 110 via buffer elements 218, 220, 222, 226 and 228 (such as Fairchild 74LS368, $V_{cc}$Gnd=8). The character recognition circuit means 146 includes a microprocessor 230 (such as Intel 8080) a programmable read only memory 232 (such as Intel 2708 1024 × 8) a read/write memory 234 (such as Intel 2111-1 256 × 4) and a read/write memory 236 (such as Intel 2111-1 256 × 4) all of which is electrically connected by interconnecting circuit means 237 as illustrated in FIG. 11 including a pair of latch circuits 238 and 240 (such as Intel 8212). Output from the character recognition circuit means 146 is connected with an eight digit display light emitting diode 242. The following is a program which could be used to program the memory 232 in FIG. 11 for detecting, and recognizing sequences of stroke signals produced by transducer means 110:

```
0016:    4RSG0001,GRIMES      12/01/76    15:49
;::::::::::::::::::::::::::::::::::::::::::::::::::::::::::::::::::::::
;::::::::::     CALCULATION AND STROKE DECODING ROUTINE   ::::::::::::
;::::::::::         WRITTEN FOR SANFORD WRIGHT BY         ::::::::::::
;::::::::::      RALPH S. GRIMES AND PETER T. ANDERSON    ::::::::::::
;::::::::::::::::::::::::::::::::::::::::::::::::::::::::::::::::::::::
;
;THESE ROUTINES ARE WRITTEN IN THE INTEL 8080 MACRO ASSEMBLER
;
;::::::::::::::::::::::::::::::::::::::::::::::::::::::::::::::::::::::
;
;MACRO TO SET THE L REGISTER TO AN ADDRESS
SETL     MACRO LOC
         MVI   L,LOC AND 0FFH
         ENDM
;
;======================================================================
;++++++++++++++++++++++++++++++++++++++++++++++++++++++++++++++++++++++
;
;<<<<<<<<       INPUT/OUTPUT         >>>>>>>>>>>>>>>>>>>>
;
SWIN     EQU   800H            ;INPUT FROM SWITCHES
;
TCH      EQU   128             ;TIP TOUCHES PAPER
UP       EQU   64              ;TIP MOVING UP
DWN      EQU   32              ;TIP MOVING DOWN
RIT      EQU   16              ;TIP MOVING RIGHT
LFT      EQU   8               ;TIP MOVING LEFT
SPARE    EQU   4               ;SPARE BIT
;----------------------------------------------------------------------
```

```
DIGOUT   EQU   800H           ;DIGITS OUTPUT (ONE BIT ON)
;
SEGOUT   EQU   0C00H          ;DISPLAY SEGMENTS OUTPUT (0=ON)
;
SEGDP    EQU   128            ;DECIMAL POINT
SEGG     EQU   64             ;SEGMENTS:
SEGF     EQU   32             ;       -A-
SEGE     EQU   16             ;      F   B
SEGD     EQU   8              ;       -G-
SEGC     EQU   4              ;      E   C
SEGB     EQU   2              ;       -D-
SEGA     EQU   1              ;
;
;::::::::::::::::::::::::::::::::::::::::::::::::::::::::::::::::
;
;<<<<<<<<<<      CONVERSION TABLES    >>>>>>>>>>>>>>>>>>>>>>>>>
;
         ORG   ENDRTN         ;AT END OF ROM
;
         DB    66H,6DH,7CH,7  ;4,5,6,7
         DB    7FH,67H,40H,80H ;8,9,-,.
         DB    5CH,50H,79H,0  ;O(LC),R(LC),E,BLANK
;
DIGITS   EQU   $              ;ONE OF EIGHT BITS ON
         DB    1,2,4,8
         DB    10H,20H,40H,80H
;
ERR      EQU   $              ;ERROR MESSAGE
         DB    0AEH,0DDH,0CDH,0AFH ;-ERROR-
BLANK:   DB    0FFH,0FFH,0FFH,0FFH ;ALL BLANKS
NULL:    DB    0,0,0,0        ;ALL ZEROES
;
;::::::::::::::::::::::::::::::::::::::::::::::::::::::::::::::::
;
;<<<<<<<<<<<<      MEMORY   EQUATES    >>>>>>>>>>>>>>>>>>>>
;
DATA     EQU   400H           ;START OF RAM
STBEG    EQU   500H           ;INITIAL STACK POINTER
BEGIN    EQU   00             ;START OF PROGRAM
;
;::::::::::::::::::::::::::::::::::::::::::::::::::::::::::::::::
;
         TITLE 'DATA AREA              '
;::::::::::::::::::::::::::::::::::::::::::::::::::::::::::::::::
;
         ORG   DATA
DSPDA:   DS    4              ;DISPLAY AREA
;
RECW1:   DS    1              ;STROKE RTN WORK AREAS
RECW2:   DS    1
STWK1:   DS    1
;
DCNT:    DS    1              ;DIGIT COUNTER
OLDI9:   DS    36
INPT1:   DS    1
INPT5:   DS    1
;
;<<<<<<<<   NUMBER WORK AREA   >>>>>>>>>>>>>
OLDSP:   DS    1              ;OLD VALUE POINTER
;
```

```
;<<<<<<<<<<        FLAGS         >>>>>>>>>>>>>>>>>>>>
FLAGS    EQU     $
OP:      DS      1               ;OPERATION CODE
DGCNT:   DS      1               ;ANOTHER DIGIT COUNT
ENTRY:   DS      1               ;ENTRIES COUNT
WIPE:    DS      1               ;ERASE DIGIT FLAG
;
;::::::::::::::::    END OF DATA AREA    ::::::::::::::::::::::
;
         TITLE  'CHARACTER RECOGNITION ROUTINES   '
;==================================================================
;<<<<<<<<<<<<     INITIALIZATION    >>>>>>>>>>>>>>>>>>>>
;
         ORG    BEGIN
         LXI    SP,STBEG         ;SET STACK POINTER
;
RESTRT   EQU    $                ;RESTART LOCATION
         MVI    A,INPUT-4
         STA    OLDSP
;
         MVI    B,4              ;LOOP COUNTER
         XRA    A                ;CLEAR ACCUMULATOR
         LXI    H,FLAGS          ;RESET FLAGS
RLOOP:   MOV    M,A
         INX    H
         DCR    B
         JNZ    RLOOP
;
;==================================================================
;<<<<<<<<<<     CHARACTER RECOGNITION    >>>>>>>>>>>>>>>>>>>>>>
CHAR     EQU    $
         CALL   STROKE           ;GET STROKE
         RLC                     ;CHECK TCH
         JNC    POINT            ;POINT LIFTED
         RLC
         JC     RESTRT           ;START OVER
         RLC
         JC     DOWN             ;STROKE DOWN
         RLC
         JC     RIGHT
         RLC
         JNC    CHAR             ;NO STROKE-CHECK AGAIN
;---------------------------------------------------------
;<<<<<<<<<<<<     FIRST STROKE IS LEFT    >>>>>>>>>>>>>
;
LEFT     EQU    $
         CALL   STROKE           ;GET NEXT STROKE
         ANI    DOWN             ;IS IT DOWN
         JZ     ERROR            ;UNRECOGNIZABLE IF NOT.
         CALL   STROKE
         ANI    RIT              ;IS IT RIGHT
         JZ     ERROR            ;UNRECOGNIZABLE IF NOT.
         CALL   STROKE
         RLC                     ;CHECK TCH
         JC     LEFT2            ;NOT 'C' - GO ON.
CLEAR:   XRA    A                ;C- CLEAR ENTRY
         STA    DGCNT
         LXI    H,INPUT
         LXI    D,NULL           ;CLEAR NUMBER
         CALL   MOVE4
         JMP    CHAR             ;START NUMBER AGAIN
```

```
LEFT2   EQU     $
        RLC                     ;CHECK FOR 'UP'
        JNC     LEFT4           ;JUMP IF NOT UP
        CALL    STROKE          ;0 OR 9 SO FAR
        RLC
        JC      LEFT3           ;JMP - IT'S A 9
        XRA     A               ;SET 0
        JMP     NUMB            ;ENTER THE DIGIT
;
LEFT3:  RLC
        RLC                     ;CHECK FOR DOWN
        JNC     ERROR           ;UNRECOG.
        MVI     A,9             ;SET 9
        JMP     NUMB            ;AND ENTER IT
;
LEFT4:  RLC                     ;CHECK FOR DOWN
        JNC     ERROR
        CALL    STROKE
        ANI     LFT             ;CHECK FOR LEFT
        JZ      ERROR
        CALL    STROKE          ;GET NEXT STROKE
        RLC
        JC      LEFT5           ;NOT 5 - GO ON.
        MVI     A,5
        JMP     NUMB            ;IT'S A 5
;
LEFT5:  RLC                     ;CHECK FOR UP
        JNC     ERROR
        CALL    STROKE
        ANI     RIT
        JZ      ERROR
        MVI     A,8             ; -8-
        JMP     NUMB
;
;----------------------------------------------------------------
;
        TITLE 'DOWN - 1ST STROKE DOWN        '
;================================================================
;
DOWN    EQU     $
        CALL    STROKE          ;GET NEXT STROKE
        RLC
        JC      DOWN2
        MVI     A,1             ; -1-
        JMP     NUMB
;
DOWN2:  MOV     A,C             ;RESTORE STROKE BYTE
        ANI     RIT
        JNZ     DOWN4           ;JUMP IF NOT A 4
        MVI     A,4
        JMP     NUMB            ; -4-
;
DOWN4:  MVI     A,'+'           ; -+-
        STA     OP              ;STORE OPERATOR
        LXI     D,INPUT         ;LOAD VALUE ENTERED
        LXI     H,ENTRY         ;IS IT 1ST OR 2ND NUMBER
        MOV     A,M
        ORA     A
        JZ      DOWN6           ;1ST
;
```

```
              XRA    A                ;RESET VALUE COUNTER
              MOV    M,A
              STA    DGCNT
              LXI    H,VAL2
              CALL   MOVE4            ;LOAD NUMBER FOR CALCULATION
              JMP    CALC
      ;
      DOWN6:  STA    DGCNT            ;RESET DIGIT COUNTER
              INR    M                ;INCR ENTRY COUNTER
      ;
              SETL   VAL1             ;LOAD NUMBER FOR CALC
              CALL   MOVE4
      ;
              CALL   OLDIES           ;SHIFT ALL PREVIOUS NUMBERS
      ;
              SETL   INPUT            ;CLEAR INPUT
              LXI    D,NULL
              CALL   MOVE4
      ;
              JMP    CHAR             ;GET NEXT NUMBER OR OPERATOR
      ;
      ;================================================================
              TITLE 'RIGHT - 1ST STROKE RIGHT           '
      ;================================================================
      ;
      RIGHT   EQU    $
              CALL   STROKE
              RLC
              JNC    MINUS            ;  '-' ENTERED
              RLC
              RLC
              JNC    ERROR            ;SHOULD BE DOWN
              CALL   STROKE
              RLC
              JNC    RIHT2            ;NOT A 7 IF MORE STROKES
      ;
              MVI    A,7
              JMP    NUMB
      ;
      RIHT2:  MOVA   A,C              ;RELOAD STROKE BYTE
              ANI    LFT
              JZ     ERROR            ;UNRECOG. IF NOT LEFT
              CALL   STROKE
              ANI    DWN
              JZ     RIHT3            ;NOT A 2
      ;
              MVI    A,2
              JMP    NUMB
      ;
      RIHT3:  MOV    A,C
              ANI    RIT
              JZ     ERROR
              MVI    A,3              ;  -3-
              JMP    NUMB
      ;
      ;================================================================
      ;
              TITLE 'POINT     -   DECIMAL ENTERED          '
      ;----------------------------------------------------------------
      ;
      POINT   EQU    $
```

```
            LDA    DGCNT           ;IS A NUMBER IN PROGRESS
            ORA    A
            JZ     PT2             ;NO - DISPLAY PREVIOUS OLD VALUE
;
            LXI    H,OLDSP         ;RESET VALUE POINTER
            MVIA   M,INPUT AND OFFH ;TO MOST RECENT VALUE
            JMP    CHAR            ;AND IGNORE DECIMAL
;
PT2:        LXI    H,OLDSP         ;DISPLAY PREVIOUS VALUE
            MOV    E,M             ;GET THE ADDR
            MOV    D,H             ;AND LOAD VALUE FROM THERE
            SETL   DSPDA
            CALL   MOVE4
;
            MOV    A,E             ;SAVE NEW ADDRESS
            STA    OLDSP
;
            JMP    CHAR
;----------------------------------------------------------------
;
            TITLE 'MINUS SIGN ROUTINE        '
;----------------------------------------------------------------
;
;SETS SUBTRACTION OPERATOR OR RECOGNIZES EQUAL SIGN BEING ENTERED.
;
MINUS       EQU    $
            LDA    OP              ;CHECK OPERATOR
            CPI    '-'             ;IS IT '-'
            JZ     MIN2            ;JUMP MEANS EQUAL SIGN
            MVI    A,'-'           ;'-' NOT PREVIOUSLY ENTERED
            STA    OP              ;SO SET OPERATOR
;
            LXI    D,INPUT         ;AND LOAD PREVIOUS NUMBER
            LXI    H,VAL1          ;   FOR THE CALCULATION
            CALL   MOVE4
;
            CALL   OLDIES          ;PUSH VALUE ONTO OLD STORAGE
;
            SETL   ENTRY           ;INCR ENTRY COUNTER
            INR    M
            SETL   DGCNT           ;RESET DIGIT COUNTER
            MVI    M,0
;
            JMP    CLEAR           ;CLEAR ENTRY AND WAIT FOR NEXT
;
MIN2:       XRA    A               ;CLEAR THE OPERATOR
            STA    OP
            STA    ENTRY           ;RESET ENTRY COUNTER
            MVI    A,1
            STA    WIPE            ;SET FLAG TO BUMP ANSWER DISPLAY
;
            JMP    CLEAR           ;WAIT FOR INPUT
;
;----------------------------------------------------------------
            TITLE 'MOVE4  -  MOVE 4 MEMORY BYTES      '
;::::::::::::::::::::::::::::::::::::::::::::::::::::::::::::::::
;
MOVE4       EQU    $
            MVI    B,4             ;COUNTER
```

```
MOVE5:     LDAX    D
           MOV     M,A
           INX     H
           INX     D
           DCR     B
           RZ
           JMP     MOVE5
;
;::::::::::::::::::::::::::::::::::::::::::::::::::::::::::::::::
;
;<<<<<<<<<  OLDIES      -    SHIFT OLD VALUES, 1ST IN-LAST OUT >>>>
;
OLDIES     EQU     $
           LXI     H,OLDI9
           LXI     D,OLDI9+4
           MVI     C,9
;
OLDLP:     CALL    MOVE4
           DCR     C
           RZ
           JMP     OLDLP
;
;****************************************************************
;
           TITLE   'STROKE RECOGNITION ROUTINE     '
;////////////////////////////////11111111111111111111111111111111
;
;STROKE COLLECTOR:
;       1. INPUTS SWITCHES EVERY 2 MS
;       2. PUSHES INPUT BYTE ONTO FILO STACK
;       3. WAITS FOR STABLE STROKE
;       4. RETURNS STROKE IN A AND C
;-ALL REGISTERS ARE USED
;
STROKE     EQU     $
           CALL    WAIT            ;WAIT 2 MS THEN PUSH DOWN FILO
           LXI     D,RECW4         ;NEXT TO LAST FIFO ADDR
           MVI     B,5             ;FIFO BYTE COUNT
;
STR01:     LDAX    D               ;GET DATA
           INX     D
           STAX    D               ;SAVE DATA
           DCX     D
           DCX     D
;
           DCR     B               ;LOOP COUNT
           JNZ     STR01
;
           LDA     SWIN            ;GET NEW DATA
           STAX    D               ;ADD IT TO FILO
;
;NOW WE HAVE NEW DATA IN ACCUM AND PUSHED ONTO FILO
;NEXT: RECOGNIZE IF WE HAVE A STROKE
;
           MOV     C,A             ;SAVE IT IN C
           MVI     B,5             ;FIFO BYTE COUNT
           MVI     L,0             ;MATCH COUNT
;
STR02:     LDAX    D               ;GET FILO DATA
           CMP     C               ;CHECK AGAINST MOST RECENT DATA
           JNZ     STR03           ;JMP IF NO MATCH
```

```
         INR   L              ;BUMP IF MATCH
STR03:   DCR   H              ;BYTE COUNT
         JNZ   STR02          ;LOOP TILL DONE
;
         MVI   A,4            ;MUST HAVE 4 MATCHES
         CMP   L              ;DO WE
         JNZ   STROKE         ;IF NOT - GET MORE DATA
;
         LDA   STWK1          ;GET OLD STROKE
         CMP   C              ;COMPARE TO NEW
         JZ    STROKE         ;JUMP IF NO CHANGE
;
         MOV   A,C            ;SAVE NEW STROKE
         STA   STWK1
;
         RLC                  ;CHECK FOR CONTACT
         RNC                  ;RETURN - NO CONTACT
;
         ANI   0FH            ;CHECK FOR STROKE
         JZ    STROKE         ;WAIT FOR MOTION
;
         MOV   A,C            ;RESTORE BYTE IN A
         RET
;
;<<<<<<<<<<    END OF STROKE ROUTINE   >>>>>>>>>>>>>>
         TITLE 'WAIT ROUTINE           '
;==================================================================
;
;2 MSEC WAIT ROUTINE:
;    WE GO THROUGH THIS LOOP ONCE EACH 2 MILLISECONDS
;    OR 400 CLOCK CYCLES OR ABOUT 350 INSTRUCTIONS
;
WAIT     EQU   $
         MVI   D,150          ;SO LOOP WILL BE 2 MSEC WITH CALLS
;
WAIT1:   DCR   D              ;BUMP COUNT
         JNZ   WAIT1          ;LOOP TILL DONE
;
         CALL  DISPL          ;BUMP THE DISPLAY
         RET                  ;DONE
;
;==================================================================
;
         TITLE 'DISPLAY ROUTINE          '
;::::::::::::::::::::::::::::::::::::::::::::::::::::::::::::::::::
;
;DISPLAY OUTPUTTING ROUTINE
;    USES A,B,C,H,L REGISTERS
;
DISPL    EQU   $
         LXI   H,DCNT         ;DIGIT COUNT KEPT IN RAM
         INR   M              ;BUMP IT
         MOV   A,M            ;GET IT
         ANI   7              ;CUT TO 3 BITS
         MOV   B,A            ;SAVE IT
         RAR                  ;HALVE IT
;
         LXI   H,DSPDA        ;DISPLAY LOC IN RAM
         ADD   L              ;SET UP
         MOV   L,A            ;         ADDRESS
         MOV   C,M            ;2 DIGITS TO C
```

```
           MOV     A,B             ;GET DIGIT
           RAR                     ;LSB TO CARRY
;
           MOV     A,C             ;GET 2 DIGITS
           JNC     DISP1           ;JUMP IF WE WANT LOWER DIGIT
;
           RAR                     ;MOVE HI DIGIT TO LOW
           RAR
           RAR
           RAR
;
DISP1:     ANI     0FH             ;MASK OFF HIGH BITS
           LXI     H,SEGMENT       ;SEGMENT TABLE
           ADD     L               ;GET TABLE ADDRESS
           MOV     L,A
           MOV     C,M             ;GET SEGMENTS
           MVI     A,DIGIT AND 0FFH ;DIGIT TABLE LOW ADDR
           ADD     B               ;SETUP ADDR
           MOV     L,A
           MOV     A,M             ;GET DIGIT
;
           STA     DIGOUT          ;TURN ON DIGIT
           MOV     A,C             ;GET SEGMENTS
           STA     SEGOUT          ;TURN ON SEGMENTS
           RET                     ;DONE
;
;::::::::::::::::::::::::::::::::::::::::::::::::::::::::::::::::::
;
           TITLE   'CALCULATION ROUTINES   '
;<<<<<<<<<<<<<<<<<<<<<<<<<<<<<>>>>>>>>>>>>>>>>>>>>>>>>>>>>>>>>
;
;BCD ADDITION AND BCD SUBTRACTION ROUTINES
;     FOUR BYTE NUMBERS
;     ALL REGISTERS USED
;
CALC       EQU     $
           LDA     OP              ;GET OPERATION
           CPI     '+'             ;IS IT ADDITION
           JNZ     CSUBT           ;JUMP IF NOT ADDITION
;
CADD:      LXI     H,VAL1          ;ADDITION ROUTINE
           LXI     D,VAL2          ;SET ADDR OF TWO VALUES TO ADD
           MVI     C,4             ;BYTE COUNTER
           XRA     A               ;CLEAR A AND RESET FLAGS
;
ALOOP:     LDAX    D               ;LOAD LOW BYTE
           ADC     M
           DAA
           STAX    D
           INX     H
           INX     D
           DCR     C
           JNZ     ALOOP
;
;FINISH CALC BY SETTING DISPLAY AND SAVING VALUES
;
RES:       SETL    ANS             ;SAVE ANSWER
           SETL    VAL1
           CALL    MOVE4
;
           SETL    DSPDA           ;DISPLAY ANSWER
           SETL    ANS
```

```
        CALL    MOVE4
;
        CALL    HLDIES          ;PUSH VALUES INTO HLD STORAGE
;
        JMP     CLEAR           ;WAIT FOR MORE INPUT
;
;////////////////////////////1111111111111111111111111
;
CSUBT:  SETL    VAL1            ;SUBTRACTION ROUTINE
        SETL    VAL2            ;SET ADDR: VAL1-VAL2
        MVI     C,4
        STC                     ;SET CARRY
;
SLOOP:  MVI     A,99H
        ACI     0
        SUB     M
        XCHG
        ADD     M
        DAA
        MOV     M,A
        XCHG
        INX     D
        INX     H
        DCR     C
        JNZ     SLOOP
        JMP     RES             ;GO FINISH UP
;
;(ABOVE ADD AND SUBT RTNS TAKEN FROM INTEL 8080 USER'S MANUAL)
;<<<<<<<<<<<<<<<<<<<<<<<<<>>>>>>>>>>>>>>>>>>>>>>>>>>>>>
;
        TITLE   'NUMBER ENTRY ROUTINE    '
;==========================================================
;
;NUMB TAKES A BCD DIGIT IN THE ACCUMULATOR AND ADDS IT
;  TO THE DECIMAL DIGITS IN RAM BY PUSHING EVERY OTHER
;    VALUE OVER 4 BITS.
;
NUMB    EQU     $
        STA     RECW1           ;SAVE NUMBER
        LXI     H,DGCNT         ;INCR DIGIT COUNTER
        INR     M
        MOV     A,M             ;GET IT
        CPI     9
        JM      ERROR           ;TOO MANY DIGITS
;
        LXI     H,INPT1         ;SET ADDR OF BCD NUMBER
        MOV     B,M             ;LOAD 1ST BYTE
        INR     L
        MOV     C,M
        INR     L
        MOV     D,M
        INR     L
        MOV     E,M
        INR     L
        MOV     H,M
;
        MVI     L,4             ;COUNTER
;
NLOOP:  MOV     A,B
        RAL
        MOV     B,A
```

```
        MOV     A,C
        RAL
        MOV     C,A
;
        MOV     A,D
        RAL
        MOV     D,A
;
        MOV     A,E
        RAL
        MOV     E,A
;
        MOV     A,H
        RAL
        MOV     H,A
;
        DCR     L
        JNZ     NLOOP
        MOV     A,H             ;SAVE VALUE FROM H
        LXI     H,INPT1         ;PUT NEW VALUES BACK
        MOV     M,B
        INR     L
        MOV     M,C
        INR     L
        MOV     M,D
        INR     L
        MOV     M,E
        INR     L
        MOV     M,A
;
        LDA     RECW1           ;GET NEW DIGIT BACK
        MOV     C,A             ;SAVE IT
        MOV     A,B             ;GET OLD LOW VALUE
        ANI     0F0H            ;MASK OFF LOWER BITS
        ADDA    C               ;AND PUT IN THE NEW DIGIT
        STA     INPT1           ;AND SAVE IT
;
        LDA     WIPE            ;ARE WE WRITING ANSWER
        BRA     A
        JZ      CHAR            ;NO GO GET NEXT DIGIT
;
        LXI     H,INPT1         ;YES - SHIFT DIGITS
        LXI     D,INPT2
        CALL    MOVE4
;
        SETL    INPT5
        LXI     D,NULL
        CALL    MOVE4           ;SET TOP BYTES TO ZEROES
;
        JMP     CHAR            ;AND WAIT FOR NEXT CHARACTER
;
;==========================================================
;
        TITLE   'ERROR MESSAGE ROUTINE   '
;
ERROR   EQU     $
        LXI     H,DSPDA
        LXI     D,ERR
        CALL    MOVE4
;
        JMP     CHAR            ;WAIT FOR SAME CHARACTER AGAIN
;
```

```
;================   END OF CALCULATOR ROUTINES   ================
ENDRTN    EQU    $
;
;===================================================================
;
          END
```

```
:100000003I0053E2F323C0406U4AF213D04772326
:1000100005L20E00L083010/D21601070A030007DF
:10002000DA940007DAE0000/D21400L08301E694E9
:10003000CAA302C08301E61JCAA302L08301070A69
:100040005200AF323E04212F0411CF02CD6301C30C
:1000500014000/D26300L083L10/0A6100AFC342C1
:100060002070702A3023E00C342020/D2A302CD70
:100070008J01E608LAA302CD83C10/DA8303E05A7
:10008000C342020702A302CD83L1E610CAA302EF7
:100090000L34202L0830L0/DAA0008E01C342023-9
:1000A00079E6102A303E04C342028E33230.44F
:1000B000112F042I3F047E8/LAC900AF/7323E0436
:1000C00021380+C06801C3F9013E3E04342E34CD09
:1000D000068J1L073012E2F11CF02CD6801C314002A
:1000E000CD830107D236010/0/D2A302C083010702
:1000F00002F6003E07C34202790E00C4A30200830
:10010000C01E02CA0H013E02C34202/9E61C4A3EF
:10011000023L03C34202JA3L04h/CA2501213Cu411
:10012000362FC314002130+5E542E00CD6301uA1
:10013000323C04C314003A304FE20CA5013E2L41
:100140003230041I2F04213404C7680104/3012EFA
:100150003F342E3E3600C342004F32800+3F3F04EE
:10016000SE01324100+C34203090+1A7/23130C037
:10017000C36A01210304110F04E09C0680100CS03
:10018000C37801C0101110/C40901A1312131905
:1001900005028B013A0031240F09502L001A39C29R
:1001A000A3012C00C293013E04B0C26301340104E
:1001B000B9CA8301/7230+0/1JE0FCA8301/9E0
:1001C00091591502C3010C001C021AC0347E6
:1001D000E60/4/1F210+206F4C/S1F79050190
:1001E0001F1F1F1F1E00F21AF02806F4E3E0F06F9F
:1001F0007E32000/332U0CL03A304F02C22539
:1002000002134+113+04BECFAF1ASE2/12R136E
:100210000C20A02E2F2E34CD630120E2FC0
:100220066010733010+20FE3+2E3ACE0+373E00
:100230099CE009+08+2/7E313000CZ2F02C3C2
:1002400014023E0+0+213603478CFE09FAA302162
:100250002F0446204E2056265E2059E0473147/03
:100260073174F741/57/51/5F/+1/672002500PSE
:100270C7C212F:+/02C/1E-/2207320/32+47F
:10028000+/5E0F3013/2F043A40043/CA14021+7
:100290002F0413004C05012E33110F02103013/
:1002A000C3140210004110/020050013140C0A3
:1002B000FCA43099328308U50547F A3AFC6FF011A
:1002C00002040810204/S0ALDUC0AFFFFFFFF020
:0302D000000002
:0000000U
$
```

Reference is now made to FIG. 12 wherein the power supply for the circuit illustrated in FIG. 11 is disclosed showing the provision for four separate voltage levels necessary to operate the subject microprocessor circuit. Batteries 244 and 246 may each be comprised of four 1.35 volt mercury cells and battery 246 may comprise five such mercury cells to provide the voltage levels as indicated. Gang switch 250 is provided for on and off energization of the circuit.

FIG. 13 discloses a clock circuit for the character recognition circuit of FIG. 11 wherein a clock generator and driver 252 (such as Intel 3224) is provided connected as indicated with component 254 (such as Intel 8080) which is in turn connected to decoder 256 (such as Texas Instruments 74LS155, dual 1-of-4).

Figure 14:
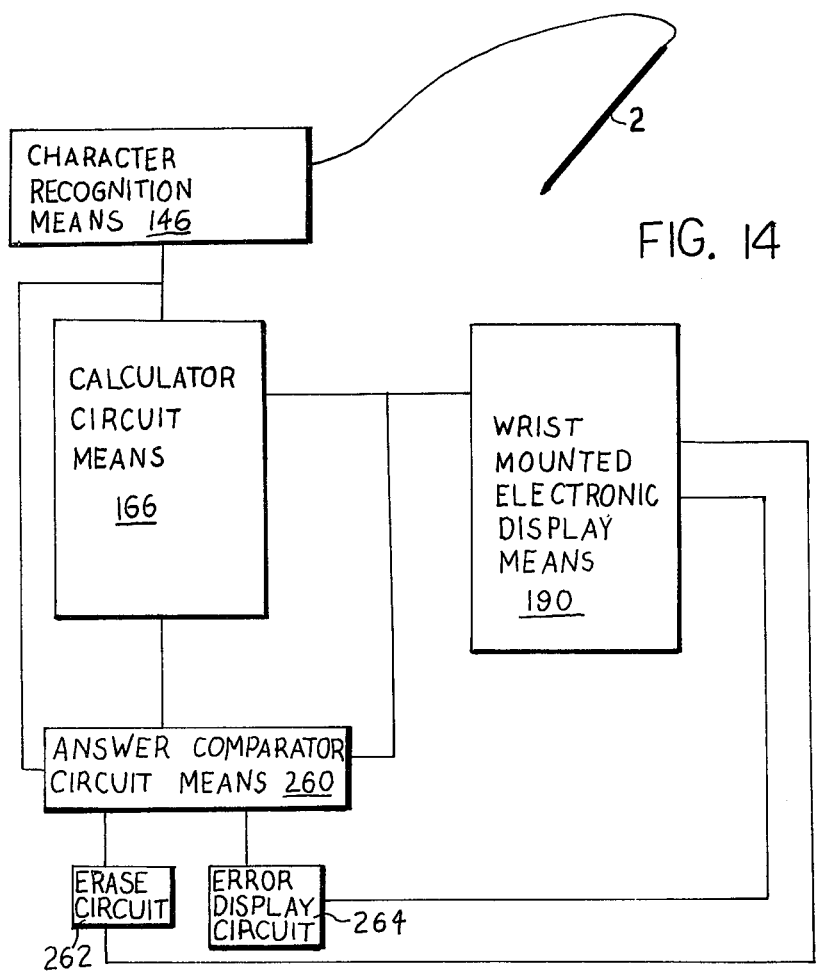
FIG. 14 is a schematic diagram of an automatic answer erasing circuit for use in combination with the circuitry of the subject invention.

FIG. 14 relates to a modification of the calculator circuit means 166 illustrated in FIG. 10. Computation of an answer by the calculator circuit means 166 for display by the wrist mounted electronic visual display means 190 automatically activates an answer comparator circuit 260 for comparing subsequently produced output signals from character recognition circuit means 146 with the answer being displayed by the electronic visual display means 190. If the character signals produced by the recognition circuit means 146 are equal to the displayed character signals, erase circuit 262 causes the display means 190 to erase the displayed answer signal. However, if inequality exists between the subsequent signals produced by the character recognition circuit means and the character signals being displayed, the electronic visual display means 190 is caused to display an error signal by means of error display circuit 264.

Figure 15:
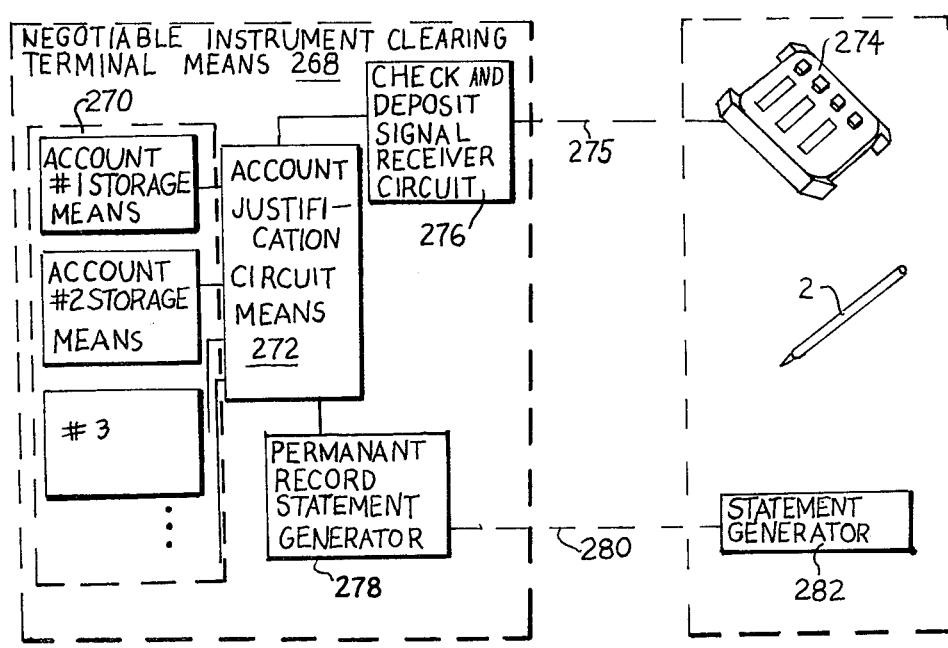
FIG. 15 is a schematic diagram of a negotiable instrument banking system employing the subject invention.

FIG. 15 illustrates diagrammatically the manner by which the apparatus of FIG. 1 may be employed in a negotiable instrument system. More particularly, a negotiable instrument clearing terminal means 268 under the control of a bank is provided for electronically producing a balanced checking account statement. The clearing terminal means 268 includes a cleared instrument storage means 270 wherein all checks presented for payment and charged against a specific account have been recorded with the information regarding the date, amount, payee and payor stored in the form of electrical signals therein. The terminal means further includes account justification circuit means 272 for receiving and comparing signals from an output means such as 216 of the account control and storage means 168 of the information control and storage means 164 illustrated in FIG. 10 and embodied in a wrist mounted device such as element 274 in FIG. 15. A check and deposit signal receiver circuit 276 is provided in the terminal means 268 for receiving the negotiable instrument transaction information from device 274 via direct connection or telephone link communication 275. Upon request by the user via direct electronic request at the negotiable instrument clearing terminal means 268 or via a telephone link 280, a permanent record statement generator 278 may be caused to produce a visible display of all negotiable instrument transactions occurring since the generation of the last permanent statement for a particular account established in the cleared instrument storage means 270. By providing information to the check deposit signal receiver circuit 276 regarding all negotiable instrument transactions recorded in device 274 for comparison with the negotiable instruments actually presented and cleared for debiting against a particular account, the permanent record statement generator operated under the control of the account justification circuit means 272 is able to provide an up-to-date statement regarding all negotiable instruments actually produced by the writing instrument means 2 including both checks that have been presented for payment and checks which are still in circulation and not yet presented for payment. A statement generator 282 under the control of the user may be connected via telephone link 280 with the bank controlled negotiable instrument clearing terminal means 268 such that the user may obtain a bank statement regarding the condition of his account at any time and at any location remote from the negotiable instrument clearing terminal means 268.

We claim:

1. A method for detecting, recognizing and displaying information created by hand movement of a human being while in a customary writing posture, comprising the steps of
   a. forming a permanent visible record of symbols on a writing surface by the movement of a writing instrument supported by a human hand;
   b. converting the symbolic and non-symbolic movement of the writing instrument relative to the writing surface into an electrical signal representative of the hand movement;
   c. identifying symbolic motion by producing electrical signals representative of only those electrical signals produced in step (b) which are validly representative of one in a predetermined set of symbolic motions;
   d. visually displaying the symbols represented by the electrical signals produced in step (c) on an electronic visual display separate and distinct from the visible record formed in step (a); and
   e. mounting the visual display in a position for viewing without disturbing the normal writing posture and without disturbing continued hand movement by mounting the visual display on the wrist of one arm of the human whose other arm is producing the symbolic movement.

2. Apparatus for recording, recognizing and displaying information created by hand movement of a human being while in a customary writing posture, comprising:
   a. mechanical writing means supported by a human hand for forming a permanent visible record of the movement of the human hand upon a mark receiving surface over which the writing means is moved;
   b. motion sensing means responsive to human hand movement for converting symbolic and non-symbolic movement of the human hand relative to a reference point into an electrical signal representative of the hand movement;
   c. electronic symbolic motion identification means communicating with said motion sensing means for producing symbol indicating electrical signals representative of only those electrical signals produced by said motion sensing means which are validly representative of one of a predetermined set of symbolic hand motions; and
   d. electronic visual display means supported on a human wrist for converting said symbol indicating electrical signals to a visible display, said display corresponds to but is separate from said visible record and is positioned for viewing without disturbing the normal writing posture and without disturbing continuous hand movement, said electronic visual display means including wrist support means for removably supporting said electronic visual display means on the wrist of one arm of a human whose other arm is supporting said mechanical writing means.

3. Apparatus as defined in claim 2, wherein said mechanical writing means includes an elongated housing member configured to be supported in a human hand as a writing instrument, said motion sensing means being mounted at one end of said elongated housing, said electronic symbolic motion identification means being contained entirely within said elongated housing member.

4. Apparatus as defined in claim 2, further including an electronic horological means for producing signals representative of time, said electronic visual display means being selectively electrically connectable with said electronic horological means to visually display symbols representative of the time.

5. Apparatus as defined in claim 4, wherein said wrist support means includes a wrist encompassing strap.

6. Apparatus as defined in claim 4, wherein said electronic symbolic identification means is mounted within said elongated housing member.

7. Apparatus as defined in claim 4, wherein said electronic horological means includes date indicating circuit means for producing electrical signals representative of the day of the year, said electronic visual display means being selectively electrically connectable with said electronic horological means to visually display symbols representative of the time and date.

8. Apparatus as defined in claim 4, further including a message reminder circuit means connected with said horological means, said electronic visual display means and said electronic symbolic motion identification means for producing reminder messages upon a preselected time and date, said message reminder circuit means including a message storage means for storing electrical signals from said motion sensing means representative of displayable message information and associated future time and dates upon which it is desired that the stored message be displayed on said electronic visual display means and date/time comparison means for comparing signals from said electronic horological means representative of the present time and date with the signals stored in said message storage means to cause the stored signals representative of displayable message information to be displayed on said electronic visual display means upon detection of a predetermined relationship between the signals representative of the present time and date and the stored date and time signals associated with the stored displayable message information.

9. Apparatus as defined in claim 8, wherein said message reminder circuit means includes an audible signal means connected with said date/time comparator means for producing an audible signal upon detection of said predetermined relationship.

10. Apparatus as defined in claim 2, wherein said electronic symbolic identification means is physically supported by said wrist support means.

11. Apparatus as defined in claim 2, wherein said mechanical writing means may be selectively supported by said wrist support means.

12. Apparatus as defined in claim 2, wherein said predetermined set of symbolic hand motions include a predetermined set of symbolic hand strokes and wherein said motion sensing means includes transducer means for producing digital stroke signals representative of said symbolic hand strokes, and wherein said electronic symbolic motion identification means includes stroke storage means for storing said successive digital stroke signals representative of the output of said transducer means during successive time intervals, and stored stroke comparator means for producing a stroke valid signal when a predetermined number of said stored digital stroke signals are equal.

13. Apparatus as defined in claim 12, wherein said electronic symbolic motion identification means includes a character recognition circuit means connected with said stored stroke comparator means for responding to predetermined sequences of successive digital stroke signals indicated to be valid by the occurrence of stroke valid signals to produce a character signal representative of one of a predetermined set of symbolic characters each of which is uniquely identified by a predetermined sequence of successive digital stroke signals.

14. Apparatus as defined in claim 13, wherein said electronic symbolic motion identification means includes clock means for defining equal successive timing intervals of approximately two milliseconds during which said stroke storage means senses and stores the digital stroke signals produced by said transducer means and wherein said stroke storage means includes four shift registers for storing four successive digital stroke signals representative of the digital electronic signals produced by said transducer means during the four preceding 2 millisecond intervals, said stored stroke comparator means including output means for producing a stroke valid signal when at least four out of the current digital stroke signal produced by said transducer means and the digital stroke signals stored in said shift registers are equal.

15. Apparatus as defined in claim 14, further including calculator circuit means for responding to sequences of character signals representative of numbers and mathematical operators to produce answer signals representative of the results of performing the mathematical operations upon the numbers contained in the sequence of character signals.

16. Apparatus as defined in claim 15, further including an answer comparator means connected with said calculator circuit means and said electronic visual display means and activated upon the display by said electronic visual display means of said answer signal to compare said answer signal with subsequent symbol indicating electrical signals to produce an erase signal for erasing said electronic visual display means when equality exists between said answer signal and said subsequent symbol indicating electrical signals and for causing an error indication symbol to be displayed by said electronic visual display means when said subsequent symbol indicating electrical signal is not equal to said displayed answer signal.

17. Apparatus as defined in claim 15, further including electronic horological means for producing date and time signals representative of the current date and time, message storage means connected to said character recognition circuit means for storing signals representative of a displayable message formed from sequences of characters and for storing a date and time representative signal associated with each said displayable message, and date/time comparator means for comparing said time and date signals produced by said electronic horological means with said stored date and time representative signals to produce a message display signal causing said electronic visual display means to display the associated displayable message whenever equality exists between said stored date and time representative signal and said date and time signal produced by said electronic horological means.

18. Apparatus as defined in claim 2, further including information control and storage means for storing signals after being visually displayed by said electronic visual display means.

19. Apparatus as defined in claim 18, wherein said information control and storage means includes financial account control and storage means for storing sequences of character signals representative of negotiable instrument transactions including payee, payor, amount and date representative signals formed by said motion sensing means, said account control and storage means including balance storage means for storing a signal representative of a checking account balance; calculator circuit means connected with said account control and storage means for producing a new checking account balance signal resulting from additions or subtractions from the amount represented by the signal stored in said balance storage means, accounting control circuit means connected with said electronic symbolic motion identification means and said balance storage means for storing new checking account balance signals produced by said calculator circuit means in said financial accounting storage means whenever signals are received from said electronic symbolic motion identification means representative of checking account deposits and negotiable instrument transactions.

20. Apparatus as defined in claim 19, wherein said account output control and storage means further includes output means for transferring all of the signals representative of negotiable instrument transactions stored in said financial account control and storage means.

21. An electronic banking system including the apparatus defined in claim 20 and further including a negotiable instrument clearing terminal means for electronically producing a balanced checking account statement, said negotiable instrument clearing terminal means including cleared instrument storage means for storing signals representative of negotiable instruments which have been presented for payment and have been paid, account justification circuit means for receiving and comparing signals from said output means representative of negotiable instrument transactions stored in said account control and storage means with signals stored in said cleared instrument storage means representative of negotiable instruments which have been presented for payment and have been paid, visual display forming means for producing a visual display of all negotiable instrument transactions wherein the negotiable instrument has not been presented for payment.

22. Apparatus as defined in claim 19, wherein said information control and storage means further includes electronic horological means for producing signals representative of time, message reminder circuit means connected with said horological means, with said electronic visual display means and with said electronic symbolic motion identification means for producing reminder messages upon a pre-selected time and date, said message reminder circuit means including a message storage means for storing signals representative of displayable messages and associated future times and dates upon which it is desired that the stored displayable message be displayed by said electronic visual display means, and date/time comparison means for comparing signals from said electronic horological means representative of the present time and date with the signals stored in said message storage means to cause the stored signals representative of the displayable message to be displayed on said electronic visual display means upon detection of a predetermined relationship between the signals representative of the present time and date and the stored date and time signals associated with the stored displayable message information.

23. Apparatus as defined in claim 22, wherein said information control and storage means includes a mode selector means for selectively connecting said account control and storage means, said calculator circuit means, said electronic horological means and said message reminder circuit means to said electronic visual display means and to said electronic symbolic motion identification means.

24. Apparatus as defined in claim 22, wherein said electronic visual display means includes a mode display and said information and control storage means includes a mode word storage means connected with said mode selector means and said mode display means to cause the mode display to indicate which of said account control and storage means, said calculator circuit means, said electronic horological means or said message reminder circuit means is connected with said electronic visual display.

25. Apparatus as defined in claim 2, wherein said electronic symbolic motion identification means includes a programmed read only memory, a random access memory, a microprocessor and interconnecting circuit means for connecting said programmed read only memory, said random access memory and said microprocessor into a physical unit sufficiently small to be supported on a human wrist.

26. Apparatus as defined in claim 2, wherein said motion sensing means and said electronic symbolic motion identification means communicate by means of modulated electromagnetic radiation.

27. Apparatus as defined in claim 26, wherein said electronic symbolic motion identification means includes transmitter/receiver circuit means for radiating electromagnetic radiation, said motion sensing means includes passive transponder means for modulating and retransmitting the electromagnetic radiation received from said transmitter/receiver circuit means, transponder control means for changing the modulation of said passive transponder means dependent upon the movement of said mechanical writing means, further wherein said transmitter/receiver circuit means receives and converts the modulated electromagnetic radiation from said passive transponder means to produce said symbol indicating electrical signals.

28. Apparatus as defined in claim 1, wherein said motion sensing means is electrically connected by an electrical conductor with said electronic symbolic motion identification means.

29. Apparatus as defined in claim 2, wherein said mechanical writing means includes an elongated housing member and a writing surface contacting tip connected with one end of said elongated housing member through an offset support such that motion of said tip relative to a writing surface while said tip is in contact with the writing surface will generate torsional forces in said offset support.

30. Apparatus as defined in claim 29, wherein said motion sensing means includes transducer means for converting said torsional forces into electrical signals representative of hand movement.

* * * * *